(12) United States Patent
Boulton

(10) Patent No.: US 11,485,385 B2
(45) Date of Patent: Nov. 1, 2022

(54) PROCESSING DATA FOR DRIVING AUTOMATION SYSTEM

(71) Applicant: BlackBerry Limited, Waterloo (CA)

(72) Inventor: Adam John Boulton, Wirral (GB)

(73) Assignee: BlackBerry Limited, Waterloo (CA)

( * ) Notice: Subject to any disclaimer, the term of this patent is extended or adjusted under 35 U.S.C. 154(b) by 227 days.

(21) Appl. No.: 16/891,699

(22) Filed: Jun. 3, 2020

(65) Prior Publication Data

US 2021/0031805 A1 Feb. 4, 2021

(30) Foreign Application Priority Data

Jul. 30, 2019 (GB) ...................................... 1910858

(51) Int. Cl.
| | |
|---|---|
| *B60W 60/00* | (2020.01) |
| *G06F 16/901* | (2019.01) |
| *G06F 16/9035* | (2019.01) |
| *B60W 40/09* | (2012.01) |
| *G06V 20/56* | (2022.01) |

(52) U.S. Cl.
CPC ........ *B60W 60/0025* (2020.02); *B60W 40/09* (2013.01); *G06F 16/901* (2019.01); *G06F 16/9035* (2019.01); *G06V 20/56* (2022.01)

(58) Field of Classification Search
CPC ............. B60W 60/0025; B60W 40/09; B60W 2050/0075; B60W 40/04; B60W 2554/402; B60W 50/00; B60W 2420/42; B60W 2554/404; B60W 2556/45; B60W 2556/55; G06F 16/901; G06F 16/9035; G06V 20/56; G08G 1/0175
See application file for complete search history.

(56) References Cited

U.S. PATENT DOCUMENTS

| | | | |
|---|---|---|---|
| 2006/0064345 A1* | 3/2006 | Biet ..................... | G07B 15/063 705/13 |
| 2014/0201266 A1* | 7/2014 | Jackson ............... | G08G 1/0175 709/224 |

(Continued)

FOREIGN PATENT DOCUMENTS

| | | |
|---|---|---|
| EP | 3035315 A1 | 6/2016 |
| WO | 2019076444 A1 | 4/2019 |

OTHER PUBLICATIONS

Extended European Search Report, EP Application No. 20176658.1, dated Nov. 23, 2020.

*Primary Examiner* — Peter D Nolan
*Assistant Examiner* — Peter Y Ning
(74) *Attorney, Agent, or Firm* — Moffat & Co

(57) ABSTRACT

A method of processing data for a driving automation system, the method comprising steps of: obtaining image data from a camera of an autonomous vehicle, AV; image processing the image data to obtain a vehicle registration mark, VRM, of another vehicle within the surrounding area of the AV; looking up the VRM in a vehicle information database to obtain information indicative of the make, the model and the date of manufacture of the other vehicle; looking up information indicative of the make, the model and the date of manufacture of the other vehicle in a vehicle dimensions database to obtain at least one dimension of the other vehicle; and updating a context of the autonomous vehicle based on said at least one dimension of the other vehicle.

16 Claims, 3 Drawing Sheets

(56) References Cited

U.S. PATENT DOCUMENTS

| | | | | |
|---|---|---|---|---|
| 2016/0171015 A1* | 6/2016 | Karlsson | ................ | G06V 20/63 |
| | | | | 707/769 |
| 2017/0248441 A1* | 8/2017 | Heimrath | .......... | B60W 50/0097 |
| 2018/0372504 A1* | 12/2018 | Singhal | ................ | G08G 1/0141 |
| 2019/0300007 A1* | 10/2019 | Hilligardt | ......... | B60W 60/0018 |
| 2019/0383631 A1* | 12/2019 | Bigio | .................... | G06V 20/59 |
| 2020/0180633 A1* | 6/2020 | Wu | ................. | B60W 30/18163 |

* cited by examiner

PROCESSING DATA FOR DRIVING AUTOMATION SYSTEM

FIELD OF TECHNOLOGY

The present disclosure relates to processing data for a driving automation system.

BACKGROUND

Autonomous vehicles, of any level of driving autonomy, rely on a range of sensors to assist with the autonomous drive. However, the sensors have limitations and can be fed with a wide range of data to augment the capabilities and even assist with predictive driving qualities, to further mimic driver anticipation. In one particular instance, cameras and LiDAR are used to identify the presence of other vehicles in the surroundings of an autonomous vehicle and to give a rough prediction on what the type of vehicle may be, such as a motorbike, a car, a bus or a heavy goods vehicle, HGV. A visualization of the surroundings of the autonomous vehicle can then be shown on the instrument cluster/center console of the vehicle to give feedback to a driver about what the vehicle "sees".

Improvements in the information provided to a driving automation system about other vehicles that are present within the surrounding of an autonomous vehicle are desirable.

SUMMARY

Accordingly, there is provided a method, a computer program and a computing device as detailed in the claims that follow.

BRIEF DESCRIPTION OF THE DRAWINGS

Examples of the present disclosure will now be described with reference to the attached figures, in which.

DETAILED DESCRIPTION

Figure 1:
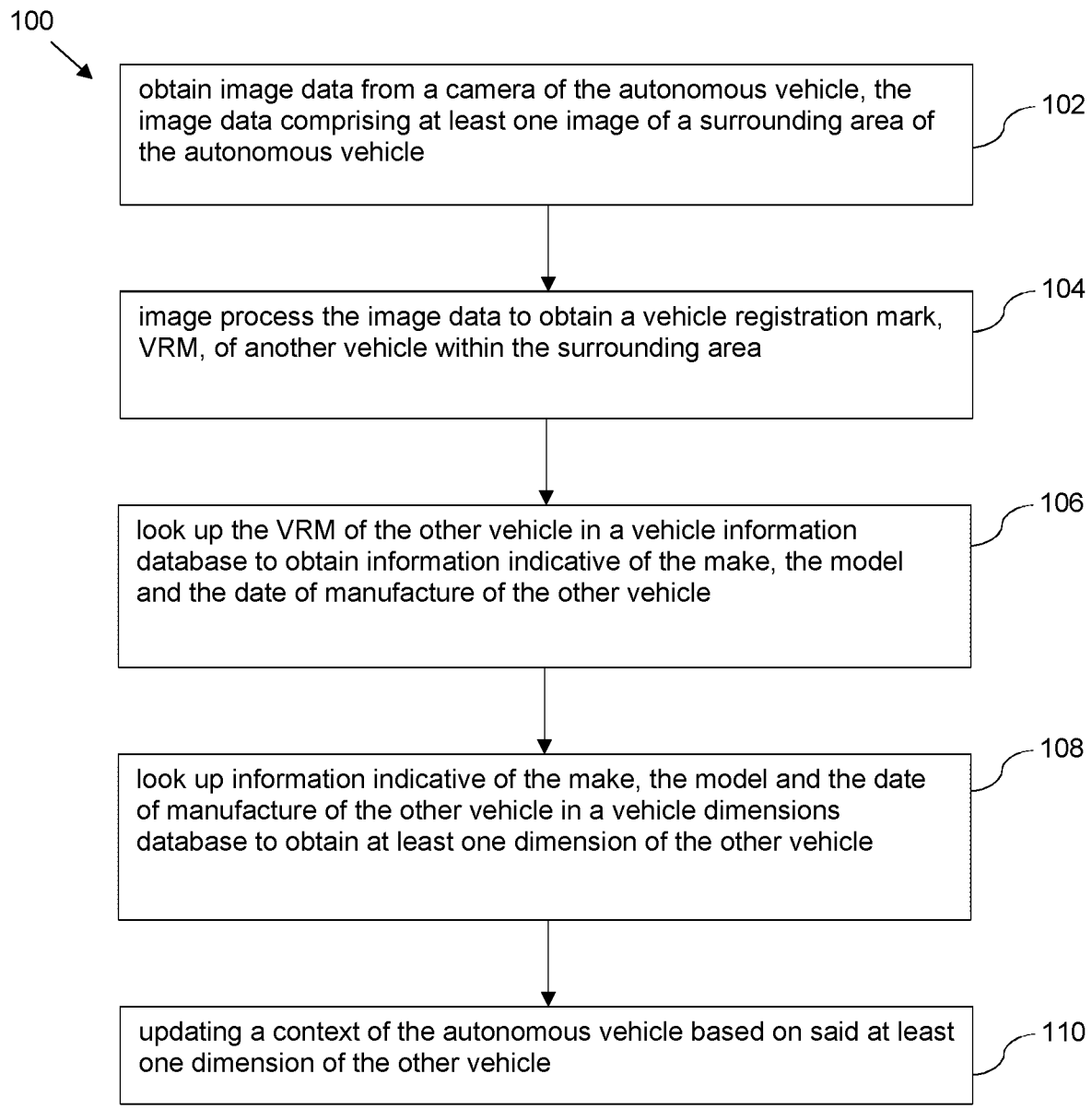
FIG. 1 is a flowchart illustrating a method in accordance with the present disclosure.

The following describes a method of processing data for a driving automation system. The method includes obtaining image data from a camera of an autonomous vehicle. The image data comprises at least one image of a surrounding area of the autonomous vehicle. The method includes image processing the image data to obtain a vehicle registration mark, VRM, of another vehicle within the surrounding area. The method includes looking up the VRM of the other vehicle in a vehicle information database to obtain information indicative of the make, the model and the date of manufacture of the other vehicle. The vehicle information database contains information indicative of each of a make, a model and a date of manufacture for each of a plurality of VRMs. The method includes looking up information indicative of the make, the model and the date of manufacture of the other vehicle in a vehicle dimensions database to obtain at least one dimension of the other vehicle. The vehicle dimensions database contains at least one respective dimension for each of a plurality of vehicles, each of the plurality of vehicles having a respective make, a respective model and a respective date of manufacture. The method includes updating a context of the autonomous vehicle based on said at least one dimension of the other vehicle.

The following describes a method for retrieving more detail about a vehicle in a surrounding area of an autonomous vehicle so that an additional data point is available to the vehicle's driving automation system. The additional data point may be used for building up the information displayed in the instrument cluster of the autonomous vehicle whilst also providing additional visibility that cameras and LiDAR on the autonomous vehicle would be otherwise unable to detect.

Levels of driving automation are defined in SAE International standard J3016 ranging from no driving automation (level 0) to full driving automation (level 5). The present disclosure relates to autonomous vehicles operating at level 3 (conditional driving automation), level 4 (high driving automation) or level 5, as defined in J3016.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

FIG. 1 is a flow diagram showing an example method 100 of processing data for a driving automation system. The method comprises steps as follows. The method comprises obtaining 102 image data from a camera of an autonomous vehicle on which the driving automation system is operating. The image data comprises at least one image of a surrounding area of the autonomous vehicle. The method then comprises image processing 104 the image data to obtain a vehicle registration mark, VRM, of another vehicle within the surrounding area of the autonomous vehicle. The method proceeds to looking up 106 the VRM of the other vehicle in a vehicle information database to obtain information indicative of the make, the model and the date of manufacture of the other vehicle. The vehicle information database contains information indicative of each of a make, a model and a date of manufacture for each of a plurality of VRMs. The method then proceeds to looking up 108 information indicative of the make, the model and the date of manufacture of the other vehicle in a vehicle dimensions database to obtain at least one dimension of the other vehicle. The vehicle dimensions database contains at least one respective dimension for each of a plurality of vehicles. Each of the plurality of vehicles is identified by a respective make, a respective model and a respective date of manufacture. The method then proceeds to updating a context of the autonomous vehicle based on said at least one dimension of the other vehicle.

The vehicle information database may, for example in the case of the UK, comprise the driver and vehicle licensing agency, DVLA, UK Vehicle Database. The at least one dimension of the other vehicle may be at least one of a width, a length and a height of the other vehicle.

In an example, the step of obtaining image data from a camera of the autonomous vehicle on which the driving automation system is operating and the step of image processing the image data to obtain a vehicle registration mark, VRM, of another vehicle within the surrounding area of the autonomous vehicle are performed at the autonomous vehicle. The step of looking up the VRM of the other vehicle in a vehicle information database is performed at a server. The method 100 comprises an additional step of transmitting a request signal from the autonomous vehicle to the server. The request signal comprises an indication of the VRM of the other vehicle.

In an example, the step of looking up the make, the model and the date of manufacture of the other vehicle in a vehicle dimensions database is performed at the server. The method 100 comprises an additional step of transmitting a response signal from the server to the autonomous vehicle. The response signal comprises an indication of the at least one dimension of the other vehicle.

In an example, the method 100 comprises an additional step of transmitting a response signal from the server to the autonomous vehicle. The response signal comprises an indication of the make, the model and the date of manufacture of the other vehicle obtained from the vehicle information database. The step of looking up the make, the model and the date of manufacture of the other vehicle in a vehicle dimensions database is performed at the autonomous vehicle, following receipt of the response signal.

In an example, updating the context of the autonomous vehicle comprises adding the at least one dimension of the other vehicle to the context.

In an example, updating the context of the autonomous vehicle comprises determining whether a value of the at least one dimension of the other vehicle obtained from the vehicle dimensions database corresponds to a value of the at least one dimension of the other vehicle and, based on the determining, updating a value of the at least one dimensions of the other vehicle within the context.

In an example, the method 100 comprises an additional step of providing the updated context to an instrument cluster of the autonomous vehicle. The updated context may alternatively or additionally be provided to at least one sensor of the autonomous vehicle.

In an example, the step of image processing the image data to obtain the vehicle registration mark, VRM, of the other vehicle is performed using computer vision, such as the OpenCV library of programming functions.

In an example, the request signal is transmitted from the autonomous vehicle using a mobile communications network. The response signal may also be received by the autonomous vehicle using the mobile communications network.

In an example, the method 100 comprises, responsive to updating the context, an additional step of modifying a behavior of the driving automation system, to modify a state of the autonomous vehicle.

In an example, the method 100 comprises an additional step of generating a control signal comprising instructions configured to cause the driving automation system to set a distance between the autonomous vehicle and the other vehicle depending on the at least one dimension of the other vehicle.

In an example, the method 100 comprises an additional step of generating a control signal comprising instructions configured to cause the driving automation system to determine an overtaking procedure for the autonomous vehicle to overtake the other vehicle depending on the at least one dimension of the other vehicle.

In this example, the at least one dimension comprises the length of the other vehicle and optionally also the width of the other vehicle.

Figure 2:
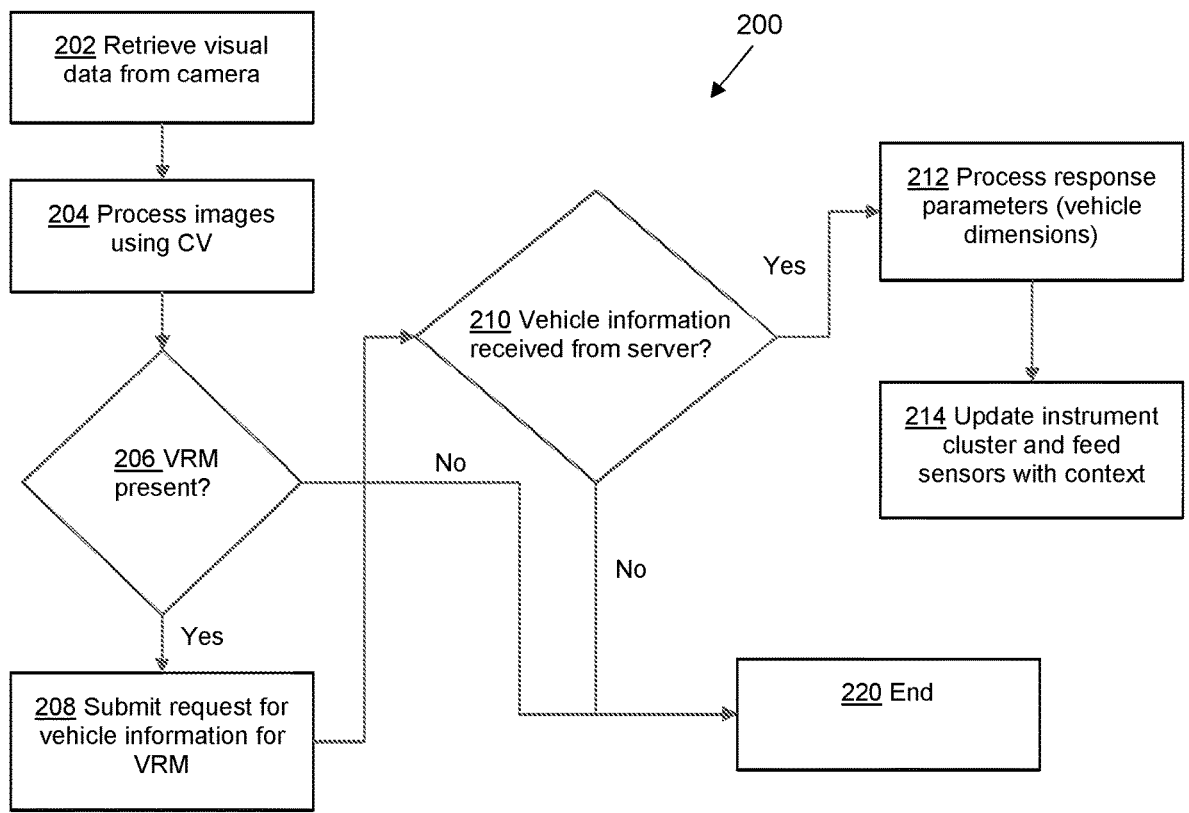
FIG. 2 is a flowchart illustrating steps of a method in accordance with the present disclosure.

As described above, some of the steps of the method 100 are performed at the autonomous vehicle and some of the steps are performed at the server. FIG. 2 is a flow diagram showing the steps of an example method 200 that are performed at the autonomous vehicle. It will be appreciated that the other steps are performed at the server.

In this example, the method 200 starts with retrieving 202 image/visual data from the camera of the autonomous vehicle. The method then proceeds to processing the images using computer vision, CV, for example using the OpenCV library of programming functionalities, and determining 206 whether there is a VRM present within the images. The method 200 may, for example, perform automatic number plate recognition, ANPR, on the camera images to obtain the VRM of another vehicle within the surroundings of the autonomous vehicle.

The method proceeds to submitting 208 a request for vehicle information for the obtained VRM. A request signal is generated that contains an indication of the obtained VRM and the request signal is transmitted from the autonomous vehicle to a server. The request signal is transmitted on a mobile communications network from the autonomous vehicle.

For example, the request signal may take the form:

```
{
"vrm": "BB19 AXB"
}
```

The request signal is received by the server at which the step of looking up 106 the VRM in the vehicle information database is performed, to obtain information indicative of the make, the model and the date of manufacture of the other vehicle.

For example, the vehicle information obtained from the vehicle information database for VRM "BB19 AAB" may take the form:

```
{
"make": "HONDA"
"model": "CR-V"
"year": "2019"
}
```

The step of looking up 108 the information indicative of the make, the model and the date of manufacture of the other vehicle in a vehicle dimensions database is also performed at the server, to obtain at least one dimension of the other vehicle. In this example, a length, a width and a height are retrieved for the other vehicle, identified by its make, model and date of manufacture, from the vehicle dimensions database. A response signal is then generated at the server and transmitted to the autonomous vehicle; the response signal is received at the autonomous vehicle on a mobile communications network.

The response signal comprises the at least one dimension and may, for example, take the form:

```
{
"height": "2000"
"width": "1700"
"length": "4700"
}
```

The response signal may also comprise the make, model and year information obtained from the vehicle information database.

Although the request signal and the response signal are transmitted from and received at the autonomous vehicle on a mobile communications network it will be appreciated that a remaining part of the route from the autonomous vehicle to the server may comprise other communications networks.

The method, at the autonomous vehicle, includes checking 210 whether vehicle information has been received from the server. If vehicle information has not been received, the method ends 220, or may alternatively loop back after a preset time to perform the check 210 again until the information is received.

Responsive to receiving the vehicle information, the method proceeds to processing 212 the vehicle dimensions (response parameters) and updating 214 the instrument cluster and feed sensors with context.

In an alternative example, the response signal may comprise an indication of the make, model and year of manufacture, and the step of looking up the make, model and year of manufacture in the vehicle dimensions database, to obtain the vehicle dimensions, is performed at the autonomous vehicle. In this alternative, an instance of the vehicle dimensions database is maintained at the autonomous vehicle.

The main issue with using visualisation and mapping technology is handling error rates but it does require the correct positioning in order to perform the visual and mapping checks. This means when an autonomous vehicle is behind another it can be very difficult for the driving automation system to "see around" the vehicle in front because of the viewing angles. However, by using automatic number plate recognition technology, an autonomous vehicle is able to determine the exact vehicle dimensions of another vehicle in its surroundings.

Once the response signal is received, it arms the driving automation system on the autonomous vehicle with the ability to make additional decisions that it would not have had access to. The methods described above may enable the detection vehicles of certain dimensions from which a following vehicle should maintain a larger distance than for a standard vehicle. For example, long vehicles require drivers of other vehicles to maintain greater distances because drivers of long vehicles are unable to see vehicles behind them when the vehicles behind are too close.

The methods described above may enable the driving automation system to tailor an overtaking maneuver depending on the dimensions of the vehicle to be overtaken. For example, knowing the length of the vehicle to be overtaken may enable the driving automation system to travel further past a long vehicle or a tractor-trailer before pulling in than when overtaking a car, and knowing the width of the vehicle to be overtaken may enable the driving automation system to determine whether it is safe to overtake a wide vehicle and to modify the lane positioning of the autonomous vehicle during the overtaking maneuver.

The methods described may enable an instrument cluster of an autonomous vehicle to present a more accurate representation of what the autonomous vehicle "sees" because of the detailed information about the dimensions of the other vehicles that the autonomous vehicle can "see". This may also bring more confidence to the end user that the vehicle is assessing the surroundings correctly. This is important as it is factors like this which are relied upon to help technology adoption.

The methods described above may reduce mis-classification of objects. For example, knowing the length of a vehicle in front may prevent a long-vehicle being incorrectly identified as a van or a standard length tractor-trailer, and vice versa. And if images of an object do not include a VRM, the object may be determined not to be a vehicle, preventing buildings and street furniture being mis-classified as vehicles.

Corresponding examples apply equally to the computer program and computing devices described below.

In an example, a computer program is provided which when executed by at least one processor is configured to implement that steps of the above described methods.

Figure 3:
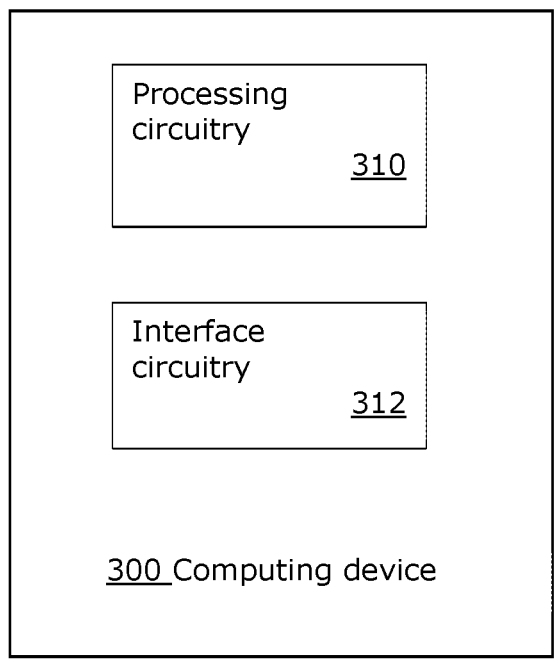
FIGS. 3 and 4 are block diagrams of computing devices in accordance with the present disclosure.

Steps of the above described methods may be implemented by a computing device, which may form part of a driving automation system of an autonomous vehicle. A block diagram of one example of a computing device 300 is shown in FIG. 3. The computing device 100 comprises processing circuitry 310 and interface circuitry 312.

The processing circuitry is configured to obtain image data from a camera of an autonomous vehicle. The image data comprises at least one image of a surrounding area of the autonomous vehicle. The processing circuitry is configured to image process the image data to obtain a vehicle registration mark, VRM, of another vehicle within the surrounding area.

The processing circuitry is configured to cause a request signal to be transmitted to a server. The request signal comprises an indication of the VRM of the other vehicle and is configured to cause the VRM of the other vehicle to be looked up in a vehicle information database to obtain information indicative of the make, the model and the date of manufacture of the other vehicle. The vehicle information database contains information indicative of each of a make, a model and a date of manufacture for each of a plurality of VRMs. The processing circuitry is configured to obtain at least one dimension of the other vehicle and to update a context of the autonomous vehicle based on the obtained at least one dimension of the other vehicle.

In an example, the processing circuitry is configured to receive a response signal from the server, the response signal comprising an indication of the at least one dimension of the other vehicle. The processing circuitry thereby obtains the at least one dimension of the other vehicle within the response signal from the server.

In an example, the processing circuitry is configured to receive a response signal from the server, the response signal comprising information indicative of a make, a model and a date of manufacture of the other vehicle. The processing circuitry is configured to look up the information indicative of the make, the model and the date of manufacture of the other vehicle in a vehicle dimensions database to obtain the at least one dimension of the other vehicle. The vehicle dimensions database contains at least one respective dimension for each of a plurality of vehicles, each of the plurality of vehicles having a respective make, a respective model and a respective date of manufacture.

Figure 4:
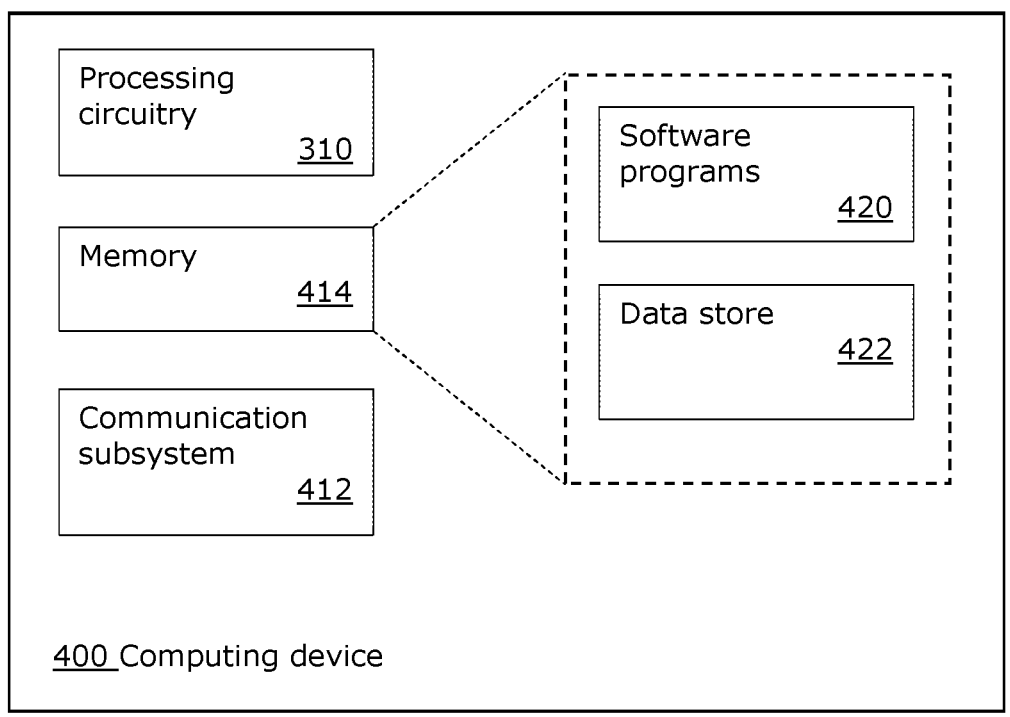

A block diagram of another example of a computing device 400 is shown in FIG. 4. The computing device 400 comprises processing circuitry 310, as described above, interface circuitry in the form of a communication subsystem 412, and memory 414.

In this example, communication functions are performed through the communication subsystem 104. The communication subsystem 104 receives response messages from and sends request messages to a wireless network (not shown), to which the server is connected. The wireless network 150 may be any type of wireless network, including, but not limited to, data wireless networks, voice wireless networks, and networks that support both voice and data communications.

The processing circuitry 310 interacts with the communication subsystem and other components, such as the memory 414 and a camera of the autonomous vehicle. The memory store software programs 420 and a data store 422, which may include the vehicle dimensions database.

The scope of the claims should not be limited by the preferred examples set forth above but should be given the broadest interpretation consistent with the description as a whole.

What is claimed is:

1. A method of processing data for a driving automation system, the method comprising steps of:
    obtaining image data from a camera of an autonomous vehicle, the image data comprising at least one image of a surrounding area of the autonomous vehicle;
    at the autonomous vehicle, image processing the image data to obtain a vehicle registration mark, VRM, of another vehicle within the surrounding area;
    causing a request signal to be transmitted to a server, the request signal comprising an indication of the VRM of the other vehicle, and the request signal being configured to cause the VRM of the other vehicle to be looked up in a vehicle information database to obtain information indicative of the make, the model and the date of manufacture of the other vehicle, the vehicle information database containing information indicative of each of a make, a model and a date of manufacture for each of a plurality of VRMs;
    causing a second request signal to be transmitted to the server, the second request signal comprising information indicative of the make, the model and the date of manufacture of the other vehicle, and the second request signal being configured to cause the make, the model, and the date of manufacture of the other vehicle to be looked up in a vehicle dimensions database to obtain at least one dimension of the other vehicle, the vehicle dimensions database containing at least one respective dimension for each of a plurality of vehicles, each of the plurality of vehicles having a respective make, a respective model and a respective date of manufacture; and
    updating a context of the autonomous vehicle based on said at least one dimension of the other vehicle.

2. The method of claim 1, wherein updating the context of the autonomous vehicle comprises adding the at least one dimension of the other vehicle to the context.

3. The method of claim 1, wherein updating the context of the autonomous vehicle comprises determining whether a value of the at least one dimension of the other vehicle obtained from the vehicle dimensions database corresponds to a value of the at least one dimension of the other vehicle, and based on the determining updating a value of the at least one dimensions of the other vehicle within the context.

4. The method of claim 1, further comprising providing the updated context to at least one of an instrument cluster of the autonomous vehicle and at least one sensor of the autonomous vehicle.

5. The method of claim 1, wherein the request signal is transmitted from the autonomous vehicle using a mobile communications network.

6. The method of claim 1, further comprising responsive to updating the context, modifying a driving behaviour of the driving automation system.

7. The method of claim 1, further comprising generating a control signal comprising instructions configured to cause the driving automation system to set a distance between the autonomous vehicle and the other vehicle depending on the at least one dimension of the other vehicle.

8. The method of claim 1, further comprising generating a control signal comprising instructions configured to cause the driving automation system to determine an overtaking procedure for the autonomous vehicle to overtake the other vehicle depending on the at least one dimension of the other vehicle.

9. A non-transitory computer program product which, when executed by at least one processor of a computing device of a driving automation system for an autonomous vehicle, cause the computing device to:
    obtain image data from a camera of the autonomous vehicle, the image data comprising at least one image of a surrounding area of the autonomous vehicle;
    image process the image data to obtain a vehicle registration mark, VRM, of another vehicle within the surrounding area;
    cause a request signal to be transmitted to a server, the request signal comprising an indication of the VRM of the other vehicle, and the request signal being configured to cause the VRM of the other vehicle to be looked up in a vehicle information database to obtain information indicative of the make, the model and the date of manufacture of the other vehicle, the vehicle information database containing information indicative of each of a make, a model and a date of manufacture for each of a plurality of VRMs;
    cause a second request signal to be transmitted to the server, the second request signal comprising information indicative of the make, the model and the date of manufacture of the other vehicle, and the second request signal being configured to cause the make, the model, and the date of manufacture of the other vehicle to be looked up in a vehicle dimensions database to obtain at least one dimension of the other vehicle, the vehicle dimensions database containing at least one respective dimension for each of a plurality of vehicles, each of the plurality of vehicles having a respective make, a respective model and a respective date of manufacture; and
    update a context of the autonomous vehicle based on said at least one dimension of the other vehicle.

10. A computing device associated to a driving automation system for an autonomous vehicle comprising:
    interface circuitry; and
    processing circuitry configured to:
    obtain image data from a camera of the autonomous vehicle, the image data comprising at least one image of a surrounding area of the autonomous vehicle;
    image process the image data to obtain a vehicle registration mark, VRM, of another vehicle within the surrounding area;
    cause a request signal to be transmitted to a server, the request signal comprising an indication of the VRM of the other vehicle and the request signal configured to cause the VRM of the other vehicle to be looked up in a vehicle information database to obtain information indicative of the make, the model and the date of manufacture of the other vehicle, the vehicle information database containing information indicative of each of a make, a model and a date of manufacture for each of a plurality of VRMs;
    cause a second request signal to be transmitted to the server, the second request signal comprising information indicative of the make, the model and the date of manufacture of the other vehicle, and the second request signal being configured to cause the make, the model, and the date of manufacture of the other vehicle to be looked up in a vehicle dimensions database to obtain at least one dimension of the other vehicle, the vehicle dimensions database containing at least one respective dimension for each of a plurality of vehicles, each of the plurality of vehicles having a respective make, a respective model and a respective date of manufacture; and update a context of the autonomous vehicle based on said at least one dimension of the other vehicle.

11. The computing device of claim 10, wherein the processing circuitry is configured to update the context of the autonomous vehicle by adding the at least one dimension of the other vehicle to the context.

12. The computing device of claim 10, wherein the processing circuitry is further configured to provide the updated context to at least one of an instrument cluster of the autonomous vehicle and at least one sensor of the autonomous vehicle.

13. The computing device of claim 10, wherein the request signal is transmitted using a mobile communications network.

14. The computing device of claim 10, wherein the processing circuitry is further configured to, responsive to updating the context, modify a driving behaviour of the driving automation system.

15. The computing device of claim 10, wherein the processing circuitry is further configured to generate a control signal comprising instructions configured to cause the driving automation system to set a distance between the autonomous vehicle and the other vehicle depending on the at least one dimension of the other vehicle.

16. The computing device of claim 10, wherein the processing circuitry is further configured to generate a control signal comprising instructions configured to cause the driving automation system to determine an overtaking procedure for the autonomous vehicle to overtake the other vehicle depending on the at least one dimension of the other vehicle.

* * * * *